Jan. 31, 1950   J. HILLIER   2,496,051
POSITIONING THE SPECIMEN STAGE OF OPTICAL APPARATUS
Filed April 28, 1948

INVENTOR
JAMES HILLIER
BY
ATTORNEY

Patented Jan. 31, 1950

2,496,051

UNITED STATES PATENT OFFICE 2,496,051

POSITIONING THE SPECIMEN STAGE OF OPTICAL APPARATUS

James Hillier, Cranbury, N. J., assignor to Radio Corporation of America, a corporation of Delaware Application April 28, 1948, Serial No. 23,833

7 Claims. (Cl. 250—49.5)

This invention relates, generally, to optical apparatus and, although having utility with relation to either light or electron optics, relates more particularly to improvements in specimen stages of electron optical apparatus and to improvements in methods of and apparatus for accurately positioning the specimen stage with respect to the axis of an electron beam.

In any high powered microscope, a very slight movement of the specimen stage may move the minute portion of the specimen, which is under observation, out of the field of view of the observer. Difficulty may then be experienced in returning the stage to its former position. This difficulty in positioning the specimen stage is greatly exaggerated in a high power electron microscope where the magnification may be 10,000 diameters or more. In addition to providing means for positioning the specimen holder in an arcuate manner, care must be taken to locate the instrument where there is no external vibration due to passing vehicles or nearby machinery. Even with these precautions, it has been found practically impossible to completely eliminate all drift of the specimen stage, after it has been positioned and the instrument is in use.

A type of specimen stage heretofore in common use in electron optical instruments comprises a metal plate rolling on ball bearings on the top surface of the objective lens coil of the instrument. A tubular shaped specimen cartridge rests in the center of the specimen stage plate and this cartridge, at its lower end, supports the specimen in the object plane of the objective lens. Motion is generally provided for the specimen stage by pushing rods having appropriate threads and reduction gears. Such a system, although satisfactory under most conditions of operation, is not perfect, for the specimen stage has been found to tend to drift after the operator has maneuvered the specimen into a desired position and the specimen holder has been found to vibrate by about $5 \times 10^{-8}$ inches—not enough to hinder most observations but troublesome when the maximum resolving power is desired.

For example, the presence of extremely small-scale vibrations of the specimen stage makes it difficult to attain a resolving power of the order of 10 Å., for the requirements are that the specimen shall not move by more than $2 \times 10^{-8}$ inches during the exposure time which may amount to 60 seconds. With the type of specimen stage heretofore in use, this requirement often proved difficult to meet.

A principal object of the invention is to provide an improved form of specimen stage for an optical instrument which is capable of high magnification power and a high degree of resolution.

Another main object of the present invention is to provide improved apparatus for and methods of positioning the specimen stage with respect to the aperture of the objective lens and the axis of the electron beam of an electron optical instrument.

Another object of the invention is to provide an improved method of centering the specimen stage of an electron optical instrument with respect to the axis of an electron beam.

Another object of the invention is to provide an improved apparatus for positioning a specimen stage in an electron optical apparatus such that less drift will occur after a desired position has been found.

Another object of the invention is to provide an improved apparatus for moving a specimen stage of an optical instrument with a fine degree of control.

Another object of the invention is to provide an improved apparatus for controlling the positioning of the specimen stage of an electron optical instrument, which apparatus does not require additional vacuum seals for its control elements.

Still another object of the invention is to provide an improved specimen stage and positioning control means therefor, both of which are of simple construction and operation.

These and other objects will be more apparent and the invention will be more readily understood by reference to the specification and the illustrative drawings.

In general, these objects are achieved in the present invention by providing a specimen stage having a portion with a smooth undersurface which rests upon another smooth surface and over which it may be moved by sliding. The sliding motion is accomplished by controlled vibration of one of the surfaces using oscillations, preferably within the audio frequency range and of low amplitude.

Figure 1:
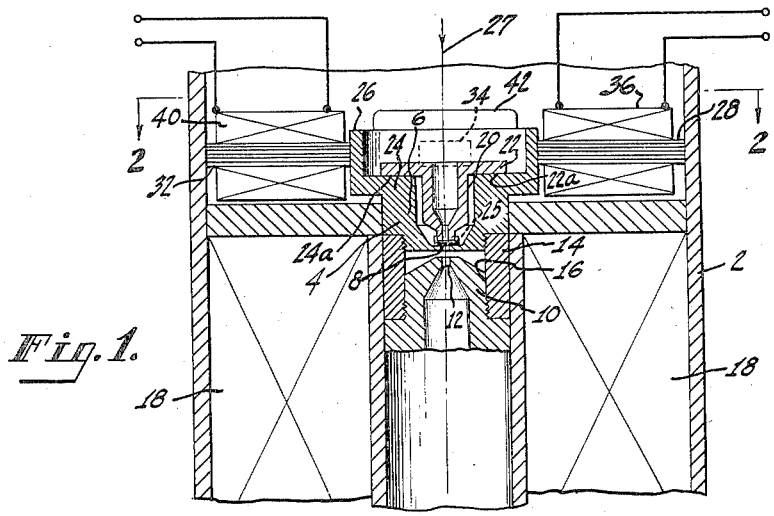
Fig. 1 is a cross sectional, partial elevation view taken through the region including the objective lens of a typical electron microscope having electromagnetic lenses, showing one embodiment of an improved specimen stage constructed according to the present invention, together with apparatus for positioning the stage.
Figure 2:
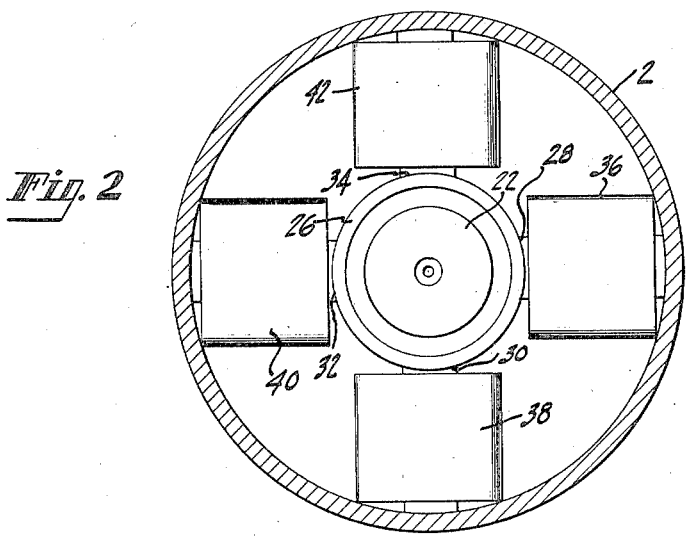
Fig. 2 is a plan view, partially in section, taken along the line 2—2 of Fig. 1.

Referring now to Fig. 1, there is shown part of the cylindrical column 2 of a typical electron microscope of the electromagnetic lens type. This instrument has an objective lens 4 having an entrance pole piece 6 with central aperture 8, and an exit pole piece 10 with central aperture 12. These pole pieces are spaced apart a desired distance by means of a threaded spacing ring 14, the ring being screwed onto corresponding threaded portions of each of the pole pieces so as to constitute a unitary assembly which fits snugly within the central cylindrical passage walls 16 of the lens. Suitable coils 18 are provided for controlling the strength of the lens from a power source (not shown) of variable strength.

The improved specimen stage of the present invention comprises a cylindrical specimen cartridge 20 having a relatively wide flanged portion 22 at its upper end. The lower face 22a of the flanged portion is lapped smooth and positioned such that this smooth face simply rests on the upper face 24a of a stepped portion 24 of the entrance pole piece 6. The face 24a is also lapped smooth to an extent such that roughness which would hinder sliding movement of the faces over each other is removed. Neither face is highly polished, however, since this would cause undesired slipping when slight external vibrations were present. A specimen holder 25 may be positioned over the lower end portion of the specimen cartridge 20. An electron beam 27 from a source (not shown) may be directed through the specimen holder and through the pole piece apertures.

The entrance pole piece 6 also is provided with a cylindrical portion 26 integral with and extending upwardly from the stepped portion 24. Connected to the upwardly extending portion 26 are four magnetostrictive elements 28, 30, 32 and 34 having their centers spaced 90° apart around the cylindrical portion 26. The magnetostrictive elements may be composed of laminated plates of nickel and each element is integrally joined to the upwardly extending portion 26 of the entrance pole piece 6 as by welding. These elements are also each wound with an exciting coil 36, 38, 40 and 42, respectively.

Figure 3:
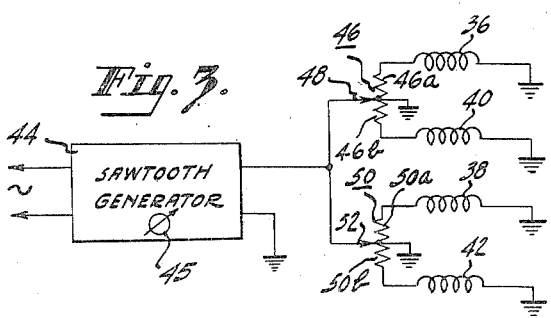
Fig. 3 is a schematic diagram of a form of circuit which may be utilized for controlling the positioning of a specimen stage by means of the apparatus shown in Fig. 1.

One embodiment of a simple control circuit which may be utilized in the present invention is illustrated schematically in Fig. 3. Each of the four exciting coils 36, 38, 40 and 42 is supplied with energy having a sawtooth wave form by a sawtooth generator 44 of any conventional design. This generator includes a conventional control 45 for varying the shape of the output wave. Two coils, 36 and 40, which are positioned 180° apart, may be connected such that one end of each coil is connected to an end of a common resistor 46 having its midpoint grounded. The other end of each coil is also grounded. A sliding contact 48 is provided to apply the output of the sawtooth generator to either one of the coils but not both at the same time. When the sliding contact is moved along one portion 46a of the resistor, the sawtooth current is applied to the coil 36. When the sliding contact is moved along the other portion 46b of the resistor, current is applied to the other coil 40 of the pair. The amplitude of the applied current depends upon the position of the sliding contact.

In a similar manner, each coil 38 and 42 of the other two coils, positioned 180° apart, is connected to an end of another resistor 50 having its midpoint grounded. A sliding contact 52 applies the output of the sawtooth generator to the particular coil desired by contacting either portion 50a or 50b of the resistor 50 and the amplitude is controlled through the positioning of the sliding contact on the resistor.

The operation of the control means in positioning the specimen stage 20 is as follows. When one of the exciting coils, say 36, is supplied with sawtooth current, its magnetostrictive core 28 is caused to vibrate. This vibration is conducted to the stepped portion 24 of the pole piece 6 and the specimen cartridge 20 is also set in vibration. The vibration is of sawtooth form and is always parallel to the vibrational axis of the armature core. The direction in which the specimen stage will be caused to move by the applied vibrations will depend upon the shape of the sawtooth energy wave. If the wave has a steep front compared to its trailing side, the stage will move away from the coil being excited. If the trailing side is steep and the wave front is a gradual slope, the specimen stage will move toward the excited coil. But when any two coils, say 36 and 38, positioned 90° apart, are energized, the resulting vibration will give two orthogonal directions of movement to the specimen cartridge. By controlling the relative amplitudes of the two vibrations through the adjustment of the two sliding contacts 48 and 52, movement of the cartridge may be brought about in a desired direction. By selecting different pairs of coils, spaced 90° apart, the direction of movement may be chosen so that the cartridge can be made to move around until the specimen holder is properly positioned for observation; that is, until the portion of the specimen in the specimen holder 25 which it is desired to investigate is in the path of the electron beam.

One of the principal improvements brought about by the apparatus of the present invention is that with the specimen stage resting firmly upon the entrance pole piece of the lens any external vibrations communicated through the instrument frame to the lens will also be communicated to the specimen stage so that both will vibrate in unison. This minimizes any tendency to drift.

It will be appreciated by those skilled in this art that many different equivalent forms of apparatus may be substituted for the form illustrated without departing from the spirit of the invention. No matter what form the specimen stage and the surface upon which it rests may take, it is merely essential that they be in intimate sliding contact through opposing surfaces of the proper degree of smoothness to permit easy sliding. It is also only essential that the vibrations be communicated in such a manner that movement may be accomplished in any desired direction. Different types of vibration sources could just as well be utilized. The frequency of the applied vibrations may be the common 60 cycles per second and may be at least as high as 3,000 cycles per second. It is preferred to use vibrations not higher in frequency than the intermediate audio frequency range.

I claim as my invention:

1. In an optical apparatus which includes a specimen stage, means for mounting said stage and means for positioning said stage, a support member having a smooth upper surface, means for slidably mounting said stage upon said surface, and means for moving said stage in any desired direction across said surface, said moving means comprising means for vibrating said member and said stage such that movement of said stage may be accomplished in any two desired orthogonal directions in the plane of said surface simultaneously.

2. An apparatus according to claim 1 in which said optical apparatus is an electron optical instrument which includes an objective lens having entrance and exit pole pieces, and in which said support member constitutes an integral part of said entrance pole piece.

3. An apparatus according to claim 2 in which said means for vibrating comprises a plurality of magnetostrictive oscillators including core members integrally connected to said support member and a source of power for driving said oscillators.

4. An apparatus according to claim 3 in which said source of power is a sawtooth generator including means for regulating the form of the output wave thereof.

5. A method of positioning the specimen stage of an optical apparatus comprising mounting said stage upon a surface over which it is free to slidably move, subjecting said surface to vibrations of controlled amplitude, said vibrations being directed from at least two different angularly spaced directions simultaneously and stopping said vibrations when said stage has reached a desired position.

6. A method according to claim 5 in which said vibrations have a sawtooth waveform of predetermined shape.

7. In an electron optical apparatus, a rigid structure comprising the entrance and exit pole pieces of an objective lens, a portion of said entrance pole piece having a smooth flat upper surface, a specimen stage slidably mounted upon said surface such that it is free to move a limited direction in any desired direction in the plane of said surface, and means for imparting sawtooth vibrations of controlled form and amplitude to said surface from two different angularly displaced sources whereby said stage is caused to move in two orthogonal directions simultaneously.

JAMES HILLIER.

No references cited.